June 5, 1962     C. G. MAJOROWICZ     3,037,611
ANIMAL FEED DISTRIBUTING DEVICE
Filed Feb. 8, 1960     2 Sheets-Sheet 1
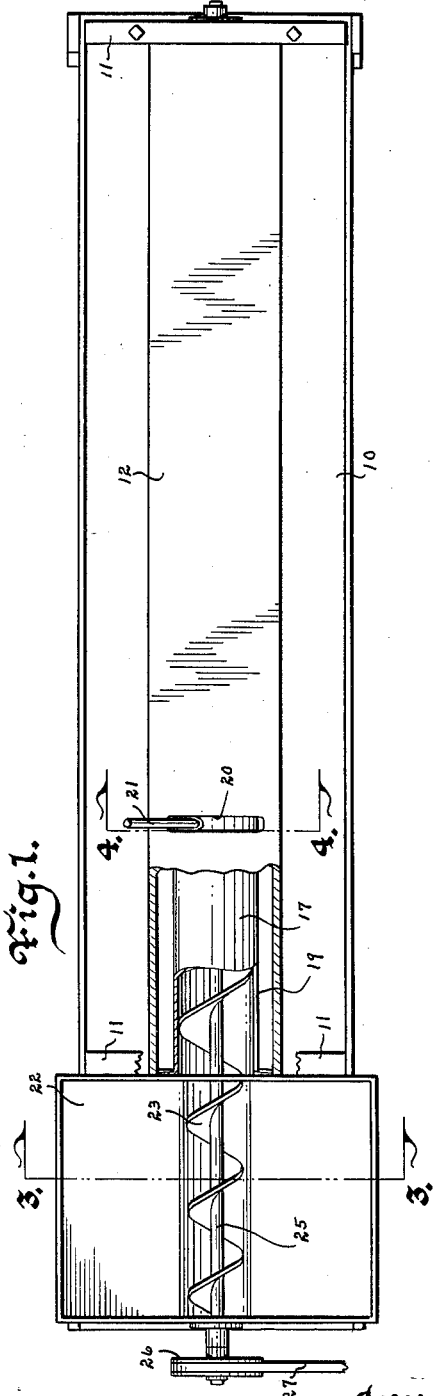
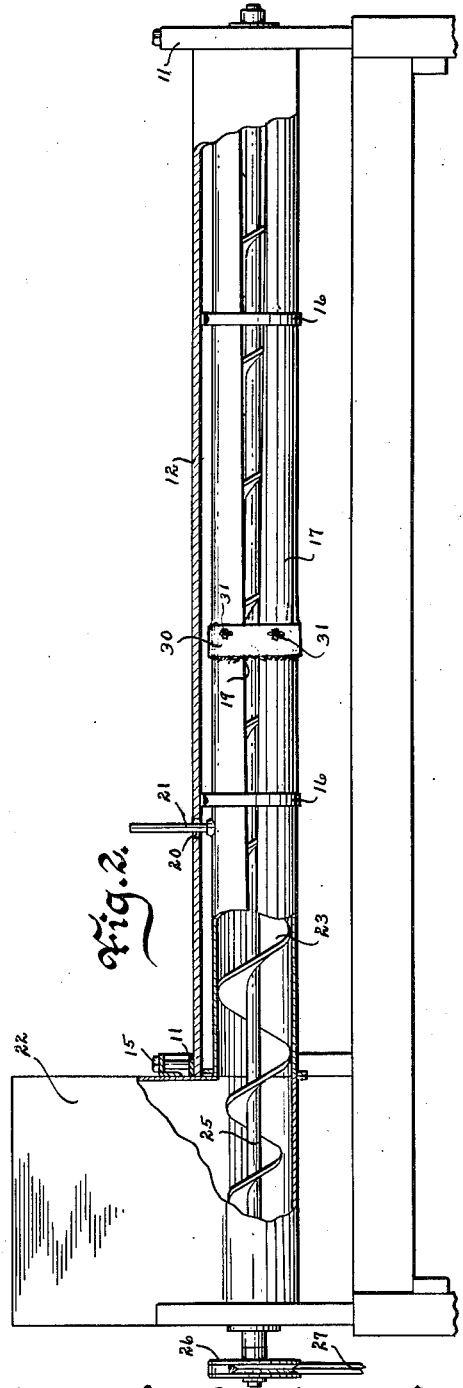
Inventor: Conrad G. Majorowicz
by M. Talbert Dick
Attorney
Witness
Edward P. Seeley June 5, 1962 C. G. MAJOROWICZ 3,037,611
ANIMAL FEED DISTRIBUTING DEVICE
Filed Feb. 8, 1960 2 Sheets-Sheet 2
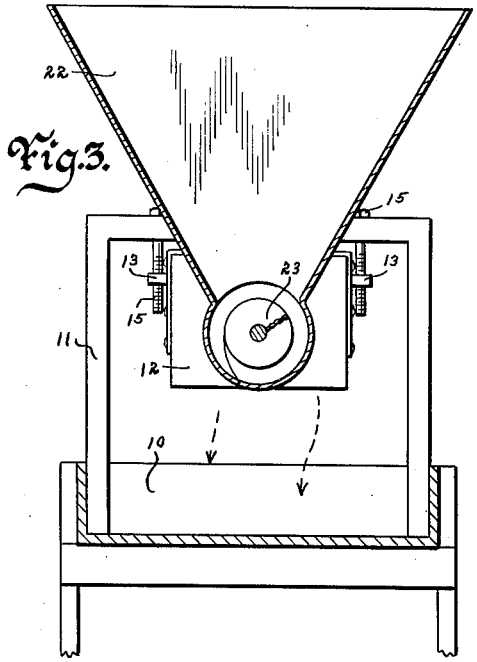
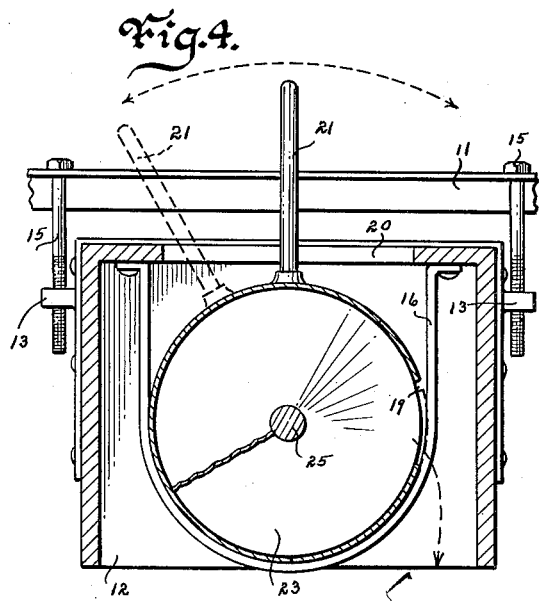
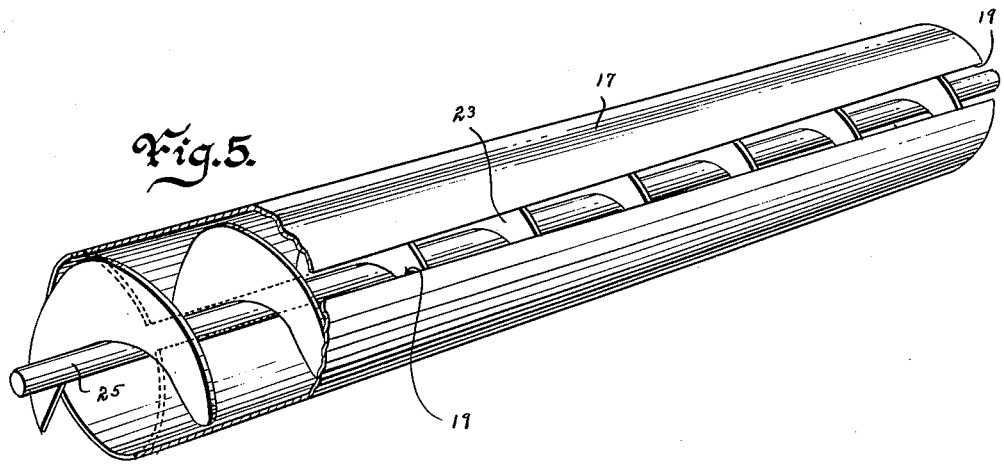
Witness
Edward P. Seeley
Inventor
Conrad G. Majorowicz
by M. Talbert Dick
Attorney

United States Patent Office 3,037,611
Patented June 5, 1962

3,037,611
ANIMAL FEED DISTRIBUTING DEVICE
Conrad G. Majorowicz, Rolfe, Iowa
Filed Feb. 8, 1960, Ser. No. 7,206
10 Claims. (198—64)

This invention relates to an animal feed distributing device and more particularly to a device that will supply and uniformly distribute material along an elongated path such as that within a long trough, bunker or like.

The use of elongated trough structures for feeding animals such as cows and horses is old. While such elongated troughs or bunkers are highly desirable, it is a continuous task to keep them furnished with the animal feed. The usual procedure is to periodically manually scoop or dump the feed into the trough structure. This, however, is not only objectionable due to the great amount of work required but the task is further handicapped by the necessity of the workman entering the animal feeding area to get the feed distributed the length of the trough member. Some attempt has been made to overcome such difficulties by having an auger conveyor extending over the bunker or trough. While such means does eliminate some work and the necessity of entering the feeding area, the distribution of the feed is not even throughout the length of the receiving trough. Furthermore, most such auger means are not under the complete adjustable control of the operator.

Therefore one of the principal objects of my invention is to provide a material distributing device that will evenly distribute the material uniformly throughout the given distance such as that of the length of a feeding trough.

A further object of this invention is to provide a feed distributing device that is capable of being adjustably controlled by the operator thereby making possible not only the rate of material distribution but also compensating for different types of materials being conveyed.

A still further object of this invention is to provide an animal feed distributing device that is not subject to damage by the feeding animals.

Still further objects of my invention are to provide an animal feed distributing means that is economical in manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a top plan view of my device installed and ready for use with sections cut away to more fully illustrate its construction;

FIG. 2 is a longitudinal sectional view of my device ready for use;

FIG. 3 is an enlarged cross-sectional view of the hopper portion of my device and is taken on line 3—3 of FIG. 1;

FIG. 4 is an enlarged cross-sectional view of the control means of the device taken on line 4—4 of Fig. 1; and FIG. 5 is a perspective view of the auger unit portion of the device and more fully illustrates its construction.

While I have indicated my device as particularly adapted for furnishing animal feed to elongated trough structures, obviously it may be used for any purpose wherein it is desired to uniformly distribute a material. Furthermore, my device may be used successfully in the distributing of animal feed even when a trough or bunker is not employed. In the drawings, however, I show my device as associated with an elongated feeding trough structure. This trough is generally designated by the numeral 10 and may be elevated as shown in FIG. 3 or it may rest on the ground surface. Secured to the trough structure 10 is a plurality of inverted U-frames 11. The numeral 12 designates an inverted trough member extending substantially the entire length of the feeding trough 10. This inverted trough member 12 is longitudinally centrally mounted above the horizontal plane of the feeding trough 10 and has a cross-sectional area much less than that of the cross-sectional area of the feeding trough as shown in FIG. 3. At each side of the inverted trough portion 12 is a plurality of bearing ears 13. The numeral 15 designates bolts rotatably extending downwardly through the inverted U-members 11 and threaded into these bearing ears 13. By this construction the inverted trough 12 will be suspended from the underside of the inverted U-frames 11 and furthermore, by rotatably adjusting the bolts 15 the inverted trough 12 may be vertically adjusted as to height relative to the feeding trough 10. Inside the inverted trough portion 12 is a plurality of circular brackets 16 rotatably supporting a cylindrical auger housing 17 as shown in FIG. 2. This cylindrical auger housing is unique in that it has a longitudinal slit opening 19 extending substantially its entire length and with the slit increasing in width as it extends forwardly as shown in FIG. 5. The numeral 20 designates a transverse slot in the top of the inverted trough 12. The numeral 21 designates a handle secured to the cylindrical auger housing and extending through the slot 20. Normally the slot opening 19 of the auger cylinder will be along one side of the housing 17 but the position of this elongated opening 19 can be adjustably changed by moving the lever arm 21 transversely as shown in FIG. 4. Obviously, the further the arm 21 is moved to the left and lowering the slot opening 19 the greater will be the amount of material discharged through the slot opening 19. Secured on the rear of the inverted trough portion 12 is a supply hopper 22 having its lower end area communicating with the inside rear of the auger housing 17. The numeral 23 designates an auger rotatably mounted to extend throughout the length of the auger housing 17, and also within the lower area of the hopper 22 as shown in FIG. 1. The shaft portion 25 of the auger has its forward end rotatably extending through the forward end of the inverted trough 12 and its rear end rotatably extending through the rear end of the hopper. The numeral 26 designates a pulley wheel or like secured on the rear end of the auger shaft 25. The numeral 27 designates a belt embracing the wheel 26. This belt is adapted to be connected to any suitable source of power such as an electric motor or like for rotating the auger at times. In fact, any suitable means may be used for rotating the auger 23.

With the material in the hopper 22 the rotating auger 23 will progressively move sufficient material from the hopper down the length of the cylindrical housing 17. As the material is so moved horizontally within the housing 17 it will pass through the slot opening 19 and fall directly downwardly into the trough structure 10. Obviously, the material within the rear portion of the auger housing will be more compact and normally and because of this fact more material would pass through the slot opening 19 in this rear area than would pass through the forward area of the slot 19. This of course would be highly objectionable inasmuch as the rear end area of the trough 10 might well be filled with feed while the front end area of the trough would have no feed. Therefore to overcome this I have progressively widened the width of the slot opening 19 as it extends forwardly thereby getting desirable even and uniform feeding of the material into the trough 10 throughout the length of the trough 10. The rapidity of despositing the feed within the trough 10 may be controlled as herebefore referred to by adjustably positioning the lever arm 21. Also it may be found that certain materials will require different adjustment. By using the inverted trough portion 12 the auger and its housing will not only be rotatably supported but by the auger and its housing being within the inverted trough 12 it will be shielded from the weather and also protected from animal damage. Preferably the inverted trough 12 should be a substantial height above the feeding trough 10 so that the animals may feed on the material from either side of the feeding trough and even feed on the material in the area directly below the inverted trough 12.

From the foregoing it will be seen that all the operator will have to do will be to place the material in the hopper 22 and the auger will carry the material evenly throughout the length of the feeding trough 10. This is all accomplished without the necessity of the operator entering the feeding area at each side of and the forward end of the feeding trough. It will be noted that the auger portion that extends into the hopper 22 is of a diameter substantially less than that of its portion that extends in the tube 17. This prevents auger choking and furnishes feed into the tube 17 at less than its maximum capacity. The tube 17 may be made up of several lengths secured together by any suitable means such as a collar 30, and bolts 31 as shown in FIG. 2. One edge of the collar is preferably welded to one tube length and the other tube length secured by bolt means extending through slots in the collar. By this construction the tube sections may be adjustably rotated relative to each other, i.e., if desired, the slot 19 of a following tube section, may be placed at a lower horizontal plane than the slot of the preceding tube section.

Some changes may be made in the construction and arrangement of my animal feed distributing device without departing from the real spirit and purpose of my invention, and it is my intention to cover by my claims, any modified forms of structure or use of mechanical equivalents which may be reasonably included within their scope.

I claim:

1. In a material distributing device, an auger tube housing having an elongated material outlet slot; said slot increasing in width as it extends forwardly, and an auger conveyor rotatably mounted in said auger tube housing.

2. In a material distributing device, an auger tube housing having an elongated material outlet slot, a frame means rotatably adjustably supporting said auger tube housing; said slot increasing in width as it extends forwardly, and an auger conveyor rotatably mounted in said auger tube housing.

3. In a material distributing device, an auger tube housing having an elongated material outlet slot, a frame means rotatably adjustably supporting said auger tube housing; said slot increasing in width as it extends forwardly, and an auger conveyor rotatably mounted in said auger tube housing, a lever secured to said auger tube housing for facilitating its rotatable adjustment on said frame means.

4. In a material distributing device, an auger tube housing having an elongated material outlet slot; said slot increasing in width as it extends forwardly, an auger conveyor rotatably mounted in said auger tube housing, and a material holding hopper in communication with said auger conveyor.

5. In a material distributing device, an inverted trough member, an auger tube housing in said inverted trough member, having an elongated material outlet slot; said outlet slot increasing in width as it extends forwardly, a material container at one end of said inverted trough, and an auger conveyor rotatably mounted in said auger tube housing and said container.

6. In a material distributing device, an inverted trough member, an auger tube housing rotatably adjustably mounted in said inverted trough member, having an elongated material outlet slot; said outlet slot increasing in width as it extends forwardly, a material container at one end of said inverted trough, and an auger conveyor rotatably mounted in said auger tube housing and said container.

7. In a material distributing device, an inverted trough member, an auger tube housing in said inverted trough member, having an elongated material outlet slot; said outlet slot progressively increasing in width as it extends forwardly, a material container at one end of said inverted trough, and an auger conveyor rotatably mounted in said auger tube housing and said container.

8. In a material distributing device, an inverted trough member, an auger tube housing in said inverted trough member, having an elongated material outlet slot; said outlet slot increasing in width as it extends forwardly, a material container at one end of said inverted trough, an auger conveyor rotatably mounted in said auger tube housing and said container, and a feeding trough spaced below said inverted trough member.

9. In a material distributing device, an inverted trough member, an auger tube housing rotatably adjustably mounted in said inverted trough member, having an elongated material outlet slot; said outlet slot increasing in width as it extends forwardly, a material container at one end of said inverted trough, an auger conveyor rotatably mounted in said auger tube housing and said container, and a handle on said auger tube housing to facilitate its rotary adjustment.

10. In a material distributing device, an inverted trough member open at its bottom, an auger tube housing in said inverted trough member, spaced apart from said trough, having its bottom plane substantially flush with the bottom plane of said trough and having an elongated material outlet slot; said outlet slot increasing in width as it extends forwardly, a material container at one end of said inverted trough, and an auger conveyor rotatably mounted in said auger tube housing and said container.

References Cited in the file of this patent

UNITED STATES PATENTS

| | | |
|---|---|---|
| 2,233,707 | Nelson | Mar. 4, 1941 |
| 2,342,652 | Eakins | Feb. 29, 1944 |
| 2,504,787 | Bailey | Apr. 18, 1950 |
| 2,630,906 | Philipp | Mar. 10, 1953 |
| 2,650,693 | King | Sept. 1, 1953 |
| 2,867,314 | Hansen | Jan. 6, 1959 |
| 2,907,500 | Kerkvliet | Oct. 6, 1959 |